Sept. 24, 1963        R. H. PARK        3,104,421
PLASTIC EXTRUSION TUBE SCRAPER APPARATUS
Filed July 13, 1962        3 Sheets-Sheet 2

INVENTOR
Robert H. Park
BY
Christel & Bean
ATTORNEYS

Sept. 24, 1963

R. H. PARK 3,104,421

PLASTIC EXTRUSION TUBE SCRAPER APPARATUS

Filed July 13, 1962

INVENTOR
Robert H. Park
BY
Christel & Bean
ATTORNEYS

United States Patent Office 3,104,421
Patented Sept. 24, 1963

3,104,421
PLASTIC EXTRUSION TUBE SCRAPER
APPARATUS
Robert H. Park, Dennis, Mass., assignor to Brockway Glass Company, Inc., Brockway, Pa.
Filed July 13, 1962, Ser. No. 209,637
12 Claims. (Cl. 18—14)

This invention relates to apparatus for producing hollow plastic articles and more particularly to apparatus for producing plastic material in tubular form by extrusion.

This application is a continuation-in-part of my copending application, Serial No. 775,055 filed November 18, 1958, and is concerned particularly with the extrusion means per se. In plastic extrusion means of the general type contemplated in the above copending application, provision is made for relative axial movement of one or more cyclically movable sleeve type members together with a cyclically movable central mandrel or blow tube whereby to control the shape, size and proportions of the plastic tube as it is being extruded.

The aforesaid axial movements of one or more of the extrusion or extrusion control members introduce cylindrical bearing surfaces for guiding and supporting such axially movable members and a special problem is presented by the tendency of the plastic material to seep through the space between he relatively sliding cylindrical surfaces which form the aforesaid axial bearing or guide surfaces between relatively movable parts of the extrusion apparatus. In the want of suitable provision to the contrary, this seepage as it progresses, eventually fills the space between the mandrel and first sleeve, or first and second sleeve, and so on, and causes sticking and other malfunctioning of the extrusion apparatus.

A main disadvantage resulting from this undesirable entry of plastic material between the surfaces of the apparatus is the production of imperfect extrusions due to the interference which plastic deposits impose upon the desired smooth and free sliding movements of the parts. This in turn becomes a source of wasteful down-time occasioned by the necessity for rather frequent dismantling and cleaning of the extrusion mechanism.

Speaking generally, the present invention provides a tubular extrusion arrangement wherein the parts of the extrusion mechanism which are adjustable in an axial direction, particularly such parts as move cyclically in an axial direction during the normal and usual cyclic operation of the extrusion apparatus, are provided with means whereby the relatively moving surfaces normally subject to plastic seepage are effectively protected against the same, or more properly, are provided with means for diverting such seepage as passes through the bearing surfaces before the same builds up along the relatively moving surfaces to such an axial extent as to impair proper operation and functioning.

In the specific construction set forth herein by way of example the principles of the present invention are exemplified in an extrusion head or mechanism of the general type contemplated in my prior Patent No. 3,008,191, dated November 14, 1961, wherein plastic material pumped to the extrusion head from a conventional plasticizer is extruded into tubular form, the tubular extrusion being received in a mold wherein it is blown into conformity with the mold cavity to form a bottle or other hollow plastic article.

The principles of the present invention are particularly applicable to extrusion mechanism of the type contemplated in my prior patent and my aforesaid pending patent application for the reason that axial movements of one or more of the extrusion elements take place cyclically during operation of the mechanism to vary the extrusion wall thickness during extrusion and to control the relative vertical disposition of the extruded tube relative to the mold means.

However, the advantages of the principles of the present invention are available in any other extrusion operation wherein relative axial movements of one or more of the extrusion or extrusion control parts are employed for the above purposes or such other purposes as, for instance, cutting off the flow of plastic material between extrusion cycles and for other purposes and functions.

A single embodiment of the principles of the present invention is illustrated in the accompanying drawings and is described in the following specification but it is to be understood that such embodiment is set forth for the purpose of illustrating the principles of the invention and the scope of the same is not limited excepting as defined in the appended claims.

In the drawings:

FIG. 4 is a view similar to FIGS. 2 and 3 but showing an upper portion of the extrusion head and a portion of the overlying structure.

Figure 1:
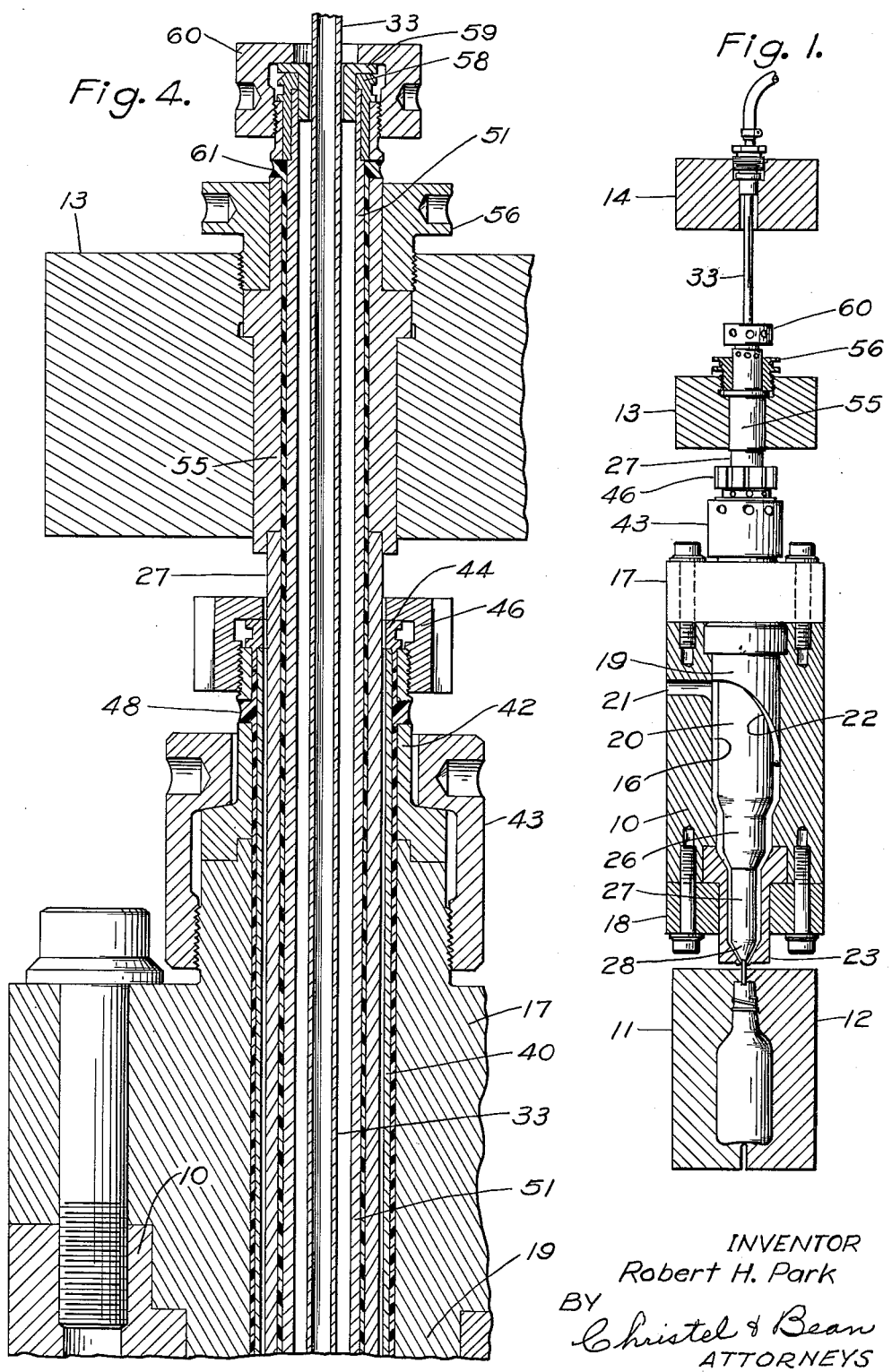
FIG. 1 is a general vertical cross-sectional view through an extruder mechanism constructed in accordance with one form of the present invention showing mold means for receiving the extruded plastic material and vertically movable support members for cyclically reciprocating certain of the extrusion members to control the tubular extrusion of the plastic material.

Like characters of reference denote like parts and, referring to FIG. 1, the numeral 10 designates an extrusion head and the numerals 11 and 12 designate a pair of separable mold halves which underlie the extruder head to receive therefrom material which has been extruded in tubular form. In FIG. 1 the numerals 13 and 14 designate horizontal beam members which are reciprocable vertically in timed relation with the operation of the extrusion means and the mold means by timing cams or other control means in a manner which is well known in the art of producing plastic bottles by tubular extrusion of the plastic material and subsequent blowing of the same into a mold cavity.

The extrusion head 10 is provided with a vertically extending generally cylindrical extrusion chamber 16 and upper and lower end cap members 17 and 18. Upper cap member 17 includes a depending cylindrical formation 19 which closes off the upper end of chamber 16 and a portion of further and progressively reduced diameter 20 which functions as a guide for the inner extrusion members, as will presently appear.

Plastic material is forced into extrusion head 10 at 21 and is distributed for relatively uniform flow downward through the annular space between extrusion chamber wall 16 and the guide portion 20 of upper cap member 17 by a curving lower end face 27 of cylindrical portion 19. Lower cap member 18 retains an extrusion die member 23 and the manner in which the internal extrusion members are constructed and operate is best illustrated in FIGS. 2 and 3, to which reference will now be had.

Figure 2:
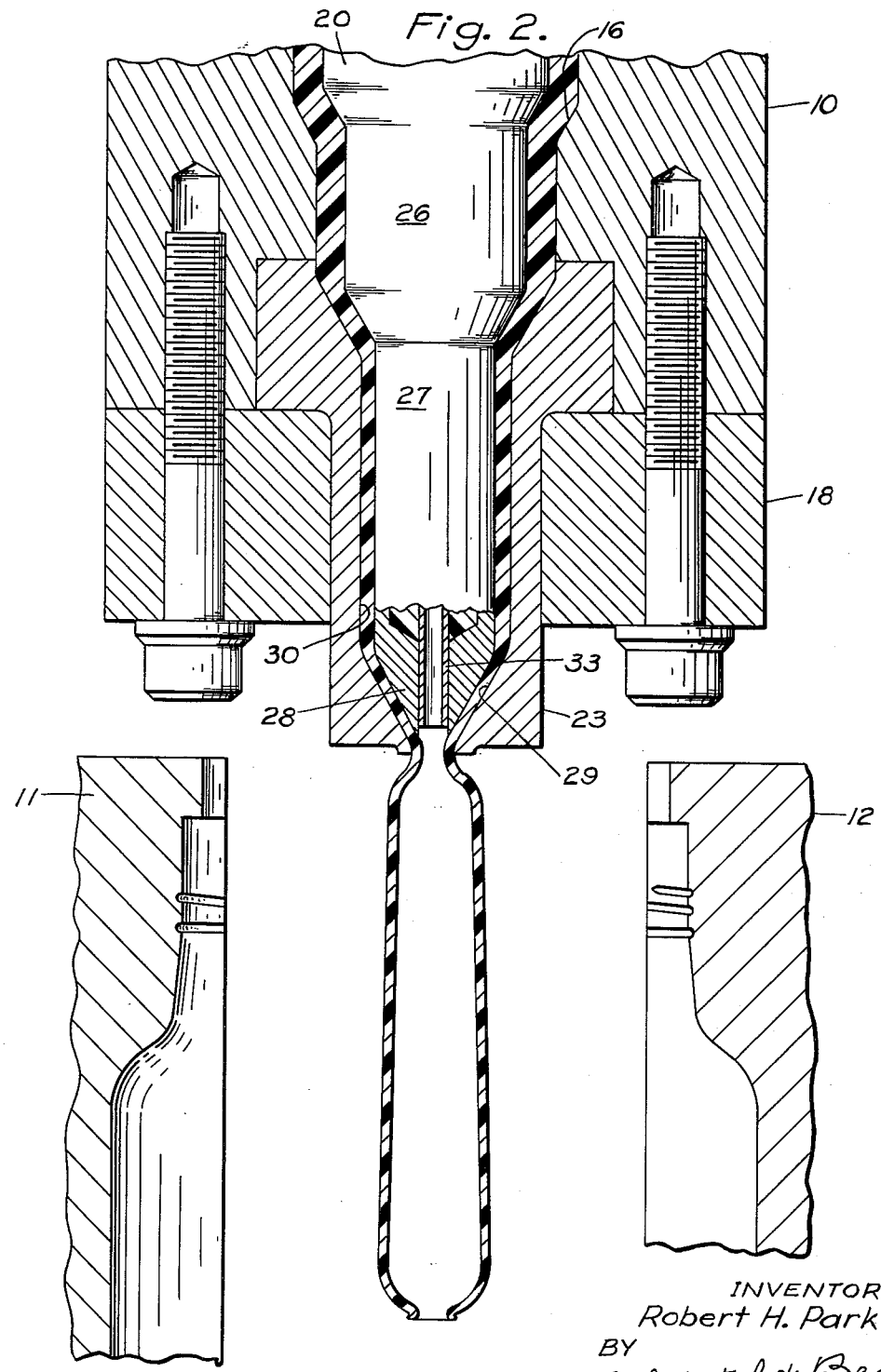
FIG. 2 is a view similar to FIG. 1 but on a larger scale and showing the manner in which a tubular extrusion is developed and automatically positioned in the space between a pair of split mold sections.
Figure 3:
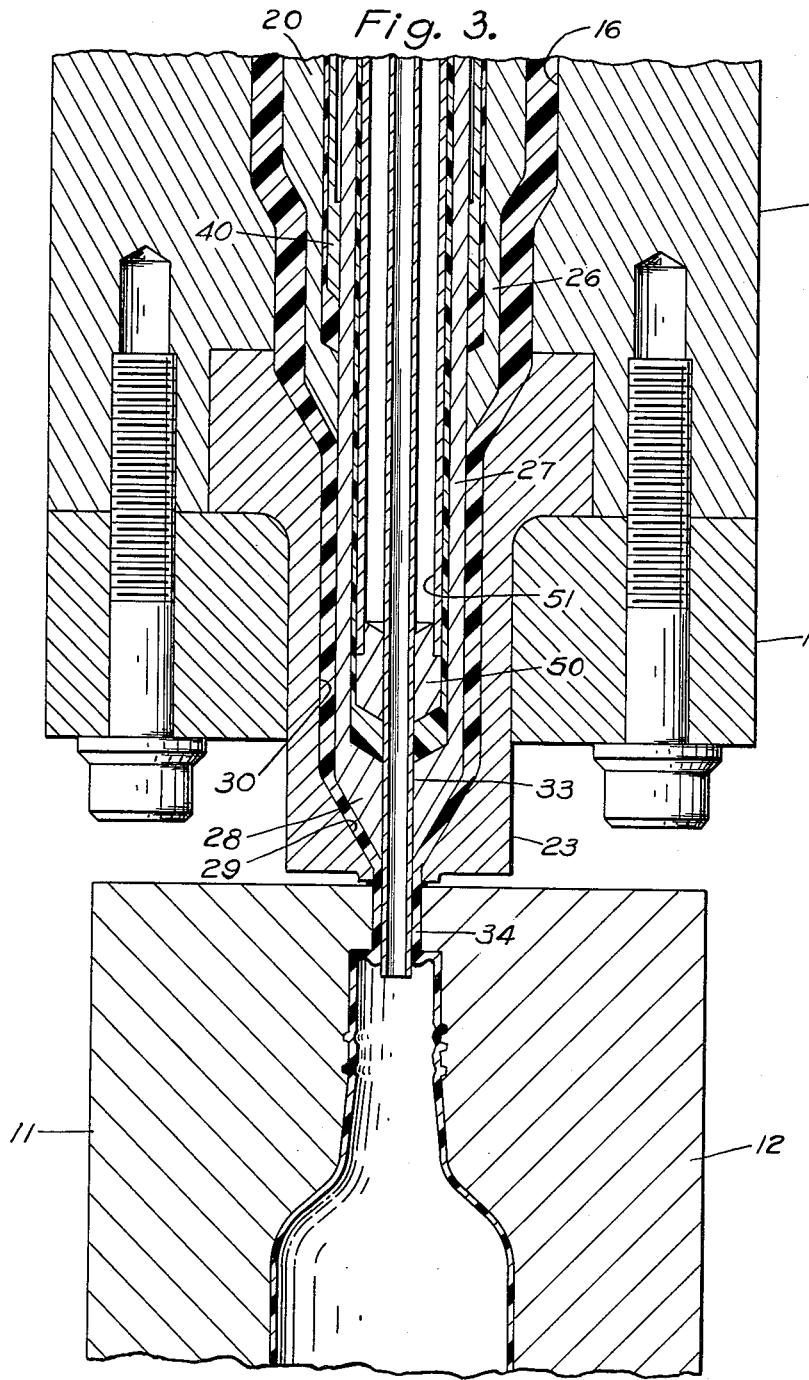
FIG. 3 is a view similar to FIG. 2 but showing the extrusion control members in further detailed cross-section and in a later phase of a cycle of operation wherein an extruded tube has been fully developed and blown.

Referring first to FIG. 2, guide portion 20 has a reduced lower end portion 26 which generally follows the reduction in diameter at the lower end of extrusion chamber 16 to provide a more or less uniform annular plastic passageway. An extrusion control sleeve 27 telescopes within guide portions 19, 26 and has a tapered lower end portion 28 which opposes a correspondingly tapered lower-portion 29 of an extrusion passage 30 in extrusion die member 23.

Control member 27 is cyclically movable in an axial direction to vary the wall thickness of the tubular plastic extrusion during the extrusion cycle to suit the needs of bottles of various shape and most commonly to produce extrusions having a thinner wall at the neck portion of the extrusion than at the body portion thereof, whereby after blowing the larger diameter body portion may have approximately the same wall thickness as the smaller diameter neck portion. Vertical reciprocation of control member 27 is effected by fixing the upper end thereof to vertically reciprocable beam member 13 as shown in FIG. 4.

In the present instance a second vertically reciprocable inner member comprises a blow tube 33 which telescopes within the lower end of control member 27 and, after development of the extrusion as illustrated in FIG. 2, is projected downwardly to form the inner surface of a so-called false finish portion 34 at the upper end of a blown bottle.

Vertical movements of blow tube 33 may be employed for various control purposes as set forth more fully in my prior Patent No. 3,008,191 and blowing air is introduced axially through the blow tube to expand the tubular extrusion into conformance with the mold cavity after the mold parts 11 and 12 have been closed on the extrusion, as shown in FIG. 3.

Blow tube 33 is connected at its upper end to beam member 14, as shown in FIG. 1, and is vertically reciprocated in timed relationship with the extrusion and blow molding mechanism generally as indicated above in a manner which is not specifically involved in the present invention, excepting to the extent that the vertical axial movements of the parts 27 and 33 enter into the scraping operations, as will appear below.

Having thus generally identified the guide means 19, 26 the control member 27, and the blow tube 33, more specific reference will now be had to the novel means by which objectionable plastic seppage or leakage is effectively prevented or corrected in order that the extrusion mechanism may function cyclically and continuously for long periods without jamming or sticking and without the necessity for frequent laborious dismantling and cleaning of the same.

At the pressures under which the plastic material is extruded in apparatus of the type here under consideration, it is virtually impossible to prevent seepage of plastic between surfaces which have sufficient clearance for relative sliding movement even though such clearances be kept to a minimum.

The present invention negatives or cancels out the harmful effects of this seepage by providing closely fitting annular scraping means operable upon relative sliding movements of the parts to scrape the peripheral surfaces thereof and, in conjunction therewith, passage means whereby the plastic material which seeps through the joints sufficiently to reach the scrapers is diverted to another path of flow of greater radial dimension and clearance and accordingly of less frictional resistance than the close clearances between the relatively intersliding parts comprising the scraper and the member fitting within it. In this way the plastic scraped from the parts is provided with harmless egress passages from the mechanism.

In FIG. 3 the numeral 40 designates a sleeve member which closely surrounds the control member 27 to effect a peripheral scraping action along the control member 27 when the latter moves relatively upwardly with respect to the fixed guide 20. Guide 20 is provided with an enlarged internal bore portion in the vicinity of scraper 40 which provides adequate clearance about the scraper for upward passage of plastic material.

Referring to FIG. 4, it will be noted that the upper end of upper cap member 17 is provided with a tubular upward extension 42 which is secured to cap member 17 by a gland-type nut 43. The upper end of scraper sleeve 40 is pressed into a head member 44 and the latter is held securely against the upper end of tubular extension 42, again by way of a gland-type nut 46. The tubular extension 42 is provided with a circumferential series of lateral openings 48 through which plastic moving upwardly between the exterior of scraper sleeve 40 and the interior of guide 20, its attached cap member 17, and tubular extension 42 may emerge.

A further annular scraper member 50 closely surrounds blow tube 33 within control member 27 and is joined to the open end of a scraper supporting sleeve 51 which is of substantially smaller external diameter than the bore in control member 27 which houses the same whereby plastic material scraped from the blow tube may pass freely upwardly around the outside of scraper 50 and supporting sleeve 51.

Referring particularly to FIG. 4, the upper end of control member 27 is joined to a tubular holder 55 which in turn is fixed to beam 13 by a gland nut 56. The upper end of scraper supporting sleeve 51 is pressed into a head member 58 and is provided with a flanged plug 59 in its upper end. Head member 58 and flanged plug 59 are jointly clamped against the upper end of tubular holder 50 by a gland nut 60 whereby scraper supporting sleeve 51 is held rigidly with respect to control member 27 and moves axially therewith. A series of lateral openings 61 in the wall of tubular holder 55 between the gland nuts 56 and 60 provide a free exit path for plastic which seeps upwardly between the exterior of scraper supporting sleeve 51 and guide member 27 and its tubular holder 55.

Thus whenever blow tube 33 is withdrawn from the position illustrated in FIG. 3, for instance, to the position illustrated in FIG. 2, the scraper 50 acts along the periphery thereof to scrape plastic therefrom and divert the same to the exit path provided as described above.

Likewise upward movements of control sleeve 27 occasion relative movement thereof with respect to scraper 40 to scrape plastic material from the periphery of control member 27 which is diverted to the exit path previously described.

The arrangement of the present invention minimizes the axial length of the two boring surfaces which are subject to plastic build-up, namely the cylindrical area of engagement between guide 20 and the periphery of control member 27 and the cylindrical area of engagement between the control member 27 and below tube 33. This reduces to a minimum the amount of plastic that is subject to shearing when the control member moves axially in its guide 20 and when the blow tube 33 moves axially in the control member 27.

Suitable heating means may be provided as required for maintaining the plastic in a sufficiently soft state to pass upwardly and out of the lateral openings 48 and 61. In the present embodiment beam 13 which constitutes the vertical drive member for control member 27 has embodied therein adjacent to the tubular holder 55 electric cartridge heaters (not shown). This heats the upper portion of the plastic flow space surrounding scraper sleeve 51 to permit relatively free egress of plastic material through openings 61.

I claim:

1. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, and a cylindrical mandrel mounted in said control member for axial movement relative thereto, the end of said means toward said orifice having a cylindrical bore fitting the periphery of said control member and an enlarged recess in a direction away from said orifice, generally tubular scraping means disposed about said control member in said recess, said scraping means having an end portion in peripheral scraping relation with said control member periphery, said tubular scraping means having an external diameter less than said enlarged recess to provide a relatively free plastic escape passage thereabout, the end of said control member toward said orifice having a cylindrical bore fitting the periphery of said mandrel and an enlarged recess in a direction away from said orifice, generally tubular scraping means disposed about said mandrel in said last mentioned enlarged recess, said last mentioned tubular scraping means having an end portion in peripheral scraping relation with said mandrel periphery, said last mentioned scraping means having an external diameter less than said last mentioned enlarged recess to provide a second relatively free plastic escape passage thereabout.

2. Apparatus for extruding thermoplastic material in tubular form comprising an extrusion chamber terminating in an extrusion orifice, a cylindrical extrusion control member mounted in said chamber for axial movement toward and away from said orifice, and a cylindrical mandrel mounted in said control member for axial movement relative thereto, the end of said control member toward said orifice having a cylindrical bore fitting the periphery of said mandrel and an enlarged recess in a direction away from said orifice, generally tubular scraping means disposed about said mandrel in said enlarged recess, said tubular scraping means having an end in peripheral scraping relation with said mandrel periphery, said scraping means having an external diameter less than said enlarged recess to provide a relatively free plastic escape passage thereabout.

3. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, the end of said means toward said orifice having a cylindrical bore fitting the periphery of said control member and an enlarged recess in a direction away from said orifice, generally tubular scraping means disposed about said control member in said recess, said scraping means having an end portion in peripheral scraping relation with said control member periphery, said tubular scraping means having an external diameter less than said enlarged recess to provide a relatively free plastic escape passage thereabout.

4. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, and a cylindrical mandrel mounted in said control member for axial movement relative thereto, the end of said means toward said orifice having a cyclindrical bore fitting the periphery of said control member, generally tubular scraping means disposed about said control member in a direction away from said orifice relative to said cylindrical bore, said scraping means having an end portion in peripheral scraping relation with said control member periphery, the end of said control member toward said orifice having a cylindrical bore fitting the periphery of said mandrel, generally tubular scraping means disposed about said mandrel in a direction away from said orifice relative to said last mentioned cylindrical bore, said last mentioned tubular scraping means having an end portion in peripheral scraping relation with said mandrel periphery.

5. Apparatus for extruding thermoplastic material in tubular form comprising an extrusion orifice, a cylindrical extrusion control member mounted in said chamber for axial movement toward and away from said orifice, and a cylindrical mandrel mounted in said control member for axial movement relative thereto, the end of said control member toward said orifice having a cylindrical bore fitting the periphery of said mandrel, and generally tubular scraping means disposed about said mandrel in a direction away from said orifice relative to said cylindrical bore, said tubular scraping means having an end portion in peripheral scraping relation with said mandrel periphery.

6. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, the end of said means toward said orifice having a cylindrical bore fitting the periphery of said control member, generally tubular scraping means disposed about said control member in a direction away from said orifice relative to said cylindrical bore, said scraping means having an end portion in peripheral scraping relation with said control member periphery.

7. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, and a cylindrical mandrel mounted in said control member for axial movement relative thereto, the end of said means toward said orifice having a cylindrical bore fitting the periphery of said control member and an enlarged recess in a direction away from said orifice, generally tubular scraping means disposed about said control member in said recess, the end of said scraping means toward said orifice being in peripheral scraping relation with said control member periphery, said scraping means having an external diameter less than said enlarged recess to provide a relatively free plastic escape passage thereabout, said tubular scraping means being attached to said first mentioned means at its opposite end, the end of said control member toward said orifice having a cylindrical bore fitting the periphery of said mandrel and an enlarged recess in a direction away from said orifice, generally tubular scraping means disposed about said mandrel in said last mentioned enlarged recess, the end of said last mentioned tubular scraping means toward said orifice being in peripheral scraping relation with said mandrel periphery, said last mentioned scraping means having an external diameter less than said last mentioned enlarged recess to provide a second relatively free plastic escape passage thereabout, said last mentioned scraping means being attached to said control member at its opposite end.

8. Apparatus for extruding thermoplastic material in tubular form comprising an extrusion chamber terminating in an extrusion orifice, a cylindrical extrusion control member mounted in said chamber for axial movement toward and away from said orifice, and a cylindrical mandrel mounted in said control member for axial movement relative thereto, the end of said control member toward said orifice having a cylindrical bore fitting the periphery of said mandrel and an enlarged recess in a direction away from said orifice, generally tubular scraping means disposed about said mandrel in said enlarged recess, the end of said tubular scraping means toward said orifice being in peripheral scraping relation with said mandrel periphery, said scraping means having an external diameter less than said enlarged recess to provide a relatively free plastic escape passage thereabout, said scraping means being attached to said control member at its oppoiste end.

9. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, the end of said means toward said orifice having a cylindrical bore fitting the periphery of said control member and an enlarged recess in a direction away from said orifice, generally tubular scraping means disposed about said control member in said recess, the end of said scraping means toward said orifice being in peripheral scraping relation with said control member periphery, said scraping means having an external diameter less than said enlarged recess to provide a relatively free plastic escape passage thereabout, said tubular scraping means being attached to said first mentioned means at its opposite end.

10. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, and a cylindrical mandrel mounted in said control member for axial movement relative thereto, the end of said means toward said orifice having a cylindrical bore fitting the periphery of said control member, generally tubular scraping means disposed about said control member in a direction away from said orifice relative to said cylindrical bore, the end of said scraping means toward said orifice being in peripheral scraping relation with said control member periphery, said tubular scraping means being attached to said first mentioned means at its opposite end, the end of said control member toward said orifice having a cylindrical bore fitting the periphery of said mandrel, generally tubular scraping means disposed about said mandrel in a direction away from said orifice relative to said last mentioned cylindrical bore, the end of said last mentioned tubular scraping means toward said orifice being in peripheral scraping relation with said mandrel periphery, said last mentioned scraping means being attached to said control member at its opposite end.

11. Apparatus for extruding thermoplastic material in tubular form comprising an extrusion chamber terminating in an extrusion orifice, a cylindrical extrusion control member mounted in said chamber for axial movement toward and away from said orifice, and a cylindrical mandrel mounted in said control member for axial movement relative thereto, the end of said control member toward said orifice having a cylindrical bore fitting the periphery of said mandrel, generally tubular scraping means disposed about said mandrel in a direction away from said orifice relative to said cylindrical bore, the end of said tubular scraping means toward said orifice being in peripheral scraping relation with said mandrel periphery, said scraping means being attached to said control member at its opposite end.

12. Apparatus for extruding thermoplastic material in tubular form comprising an extrusion chamber terminating in an extrusion orifice and means disposed in said chamber spaced radially inwardly from the walls thereof to form an annular plastic feeding passageway to said orifice, a cylindrical extrusion control member mounted in said means for axial movement toward and away from said orifice, the end of said means toward said orifice having a cylindrical bore fitting the periphery of said control member, generally tubular scraping means disposed about said control member in a direction away from said orifice relative to said cylindrical bore, the end of said scraping means toward said orifice being frusto-conical and in peripheral scraping relation with said control member periphery, said tubular scraping means being attached to said first mentioned means at its opposite end.

References Cited in the file of this patent
UNITED STATES PATENTS

| | | |
|---|---|---|
| 2,706,308 | Lorenz | Apr. 19, 1955 |
| 3,001,239 | Santelli et al. | Sept. 26, 1961 |
| 3,008,191 | Park | Nov. 14, 1961 |